United States Patent [19]

Yamamoto et al.

[11] Patent Number: 4,566,864
[45] Date of Patent: Jan. 28, 1986

[54] ELECTRIC FAN DEVICE FOR AUTOMOTIVE VEHICLE

[75] Inventors: Yosizi Yamamoto, Toyohashi; Toshio Ishikawa, Kariya, both of Japan

[73] Assignee: Nippondenso Co., Ltd., Kariya, Japan

[21] Appl. No.: 739,483

[22] Filed: May 29, 1985

Related U.S. Application Data

[63] Continuation of Ser. No. 484,360, Apr. 12, 1983, abandoned.

[30] Foreign Application Priority Data

Apr. 14, 1982 [JP] Japan .............................. 57-54819[U]
Apr. 14, 1982 [JP] Japan .............................. 57-54820[U]

[51] Int. Cl.⁴ .......................... F04B 35/04; H02K 1/28
[52] U.S. Cl. ............................... 417/353; 417/423 R; 310/64; 310/71; 310/268
[58] Field of Search ............... 417/353, 352, 354, 410, 417/423 R; 310/268, 66, 64, 65, 71

[56] References Cited

U.S. PATENT DOCUMENTS

| | | | |
|---|---|---|---|
| 2,438,629 | 3/1948 | Anderson | 310/268 |
| 3,012,159 | 12/1961 | Druesedow | 310/71 |
| 3,093,763 | 6/1963 | Sargeant et al. | 310/268 |
| 3,303,995 | 2/1967 | Boeckel | 417/353 |
| 3,477,378 | 11/1969 | Shelhart | 310/268 |
| 3,561,891 | 2/1971 | Saint-Amand | 417/353 |
| 3,566,165 | 2/1971 | Lohr | 310/268 |
| 3,961,864 | 6/1976 | Papst et al. | 310/63 |
| 4,164,690 | 8/1979 | Müller et al. | 417/410 |
| 4,360,751 | 11/1982 | Arnold, Jr. et al. | 310/268 |

FOREIGN PATENT DOCUMENTS

| | | | |
|---|---|---|---|
| 2538626 | 3/1976 | Fed. Rep. of Germany | 417/366 |
| 1397687 | 3/1965 | France | 310/268 |

*Primary Examiner*—Cornelius J. Husar
*Assistant Examiner*—Peter M. Cuomo
*Attorney, Agent, or Firm*—Cushman, Darby & Cushman

[57] ABSTRACT

As a drive source of a blowing fan for a vehicular radiator, there is used a flattened electric motor, wherein there is fixed to one of two divided housings a shaft, on which there is rotatably supported a rotor to which a flattened armature coil is joined and to which the blowing fan is fixed through a radiating member. Thus, the heat, which is generated in the armature coil, is transferred through the rotor and/or the shaft to the radiating member, by which it is efficiently radiated into the air.

5 Claims, 4 Drawing Figures

ELECTRIC FAN DEVICE FOR AUTOMOTIVE VEHICLE

This is a continuation of application Ser. No. 484,360, filed Apr. 12, 1983, which was abandoned upon the filing hereof.

BACKGROUND OF THE INVENTION

1. Field of the Invention

The present invention relates to an electric fan device which is used with a cooling radiator for an automotive engine thereby to cool down the radiator. More specifically, the present invention relates to an electric fan device of the type, in which a cooling fan is attached to the output side of a flattened motor having a printed armature built therein.

2. Description of the Prior Art

In an electric fan device for the radiator according to the prior art, a fan is fixed to the output shaft of an ordinary or flattened electric motor, and no special consideration is taken into the radiation of the heat which is generated in the armature of the electric motor.

When the flattened electric motor is to be assembled and attached to the radiator, moreover, two divided motor housings are first assembled as the motor by means of rivets or screws and are then attached to the bracket or the like of the radiator. This requires both fixing means for fixing the motor to the bracket in addition to fastening means such as the screws for assembling the two divided housings and holes or the like which are formed in the housings for the fastening means and the fixing means. As a result, the electric fan device of the prior art has its assembly parts and steps increased to provide an expensive electric fan device.

SUMMARY OF THE INVENTION

It is, therefore, an object of the present invention to provide a radiator cooling electric fan device which makes use of a flattened electric motor so that it can efficiently radiate the heat to be generated in an armature whereby it can be prevented from having its output dropped.

Another object of the present invention is to provide an electric fan device in which the assembly of the electric motor and the attachment to a radiator bracket are simplified so that the cost and the number of assembly steps can be reduced.

According to a feature of the present invention, there is fixed to one of two divided housings a shaft, on which a metal rotor is rotatably supported, wherein a flattened armature plate is fixed to the metal rotor and a radiating member for radiating the heat generated in the armature plate to the outside is also fixed to the metal rotor. According to the construction thus made, the heat generated in the armature plate can be efficiently radiated to prevent the electric motor from having its output dropped.

According to another feature of the present invention, at the joined portions of the two divided housings made of a ferromagnetic substance, one of the housings is formed with holes whereas the other is formed with annular projections to extend through those holes, and the two housings are joined to and held on each other by the magnetic force of the permanent magnet of the electric motor. At the stage of joining the two housings by the magnetic force of that permanent magnet, the assembly of the motor is completed. When the electric fan device is to be attached to the bracket of the radiator, the fastening means such as screws or rivets extend through the aforementioned annular projections to mount the motor on the bracket. As a result, simultaneously as the motor is mounted on the bracket, the two divided housings are fixedly joined at last.

DESCRIPTION OF THE PREFERRED EMBODIMENT

Figure 1:
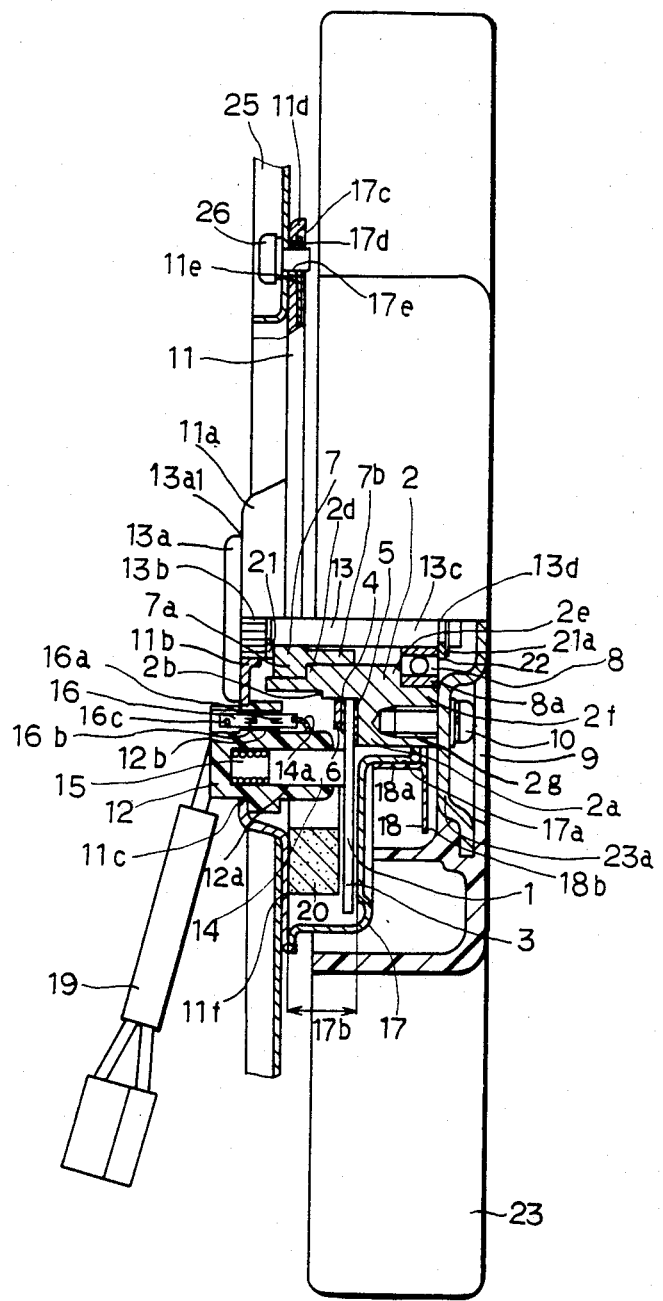
FIG. 1 is a partially sectional view showing an electric fan device according to the present invention.
Figure 1A:
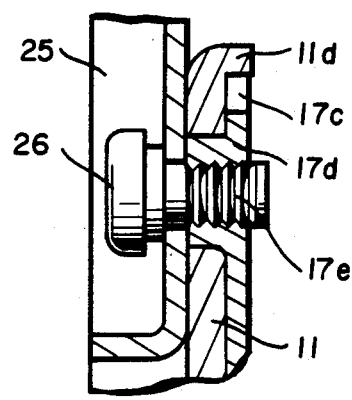
FIG. 1A is a fragmentary sectional view showing on a larger scale a detail generally depicted at the upper left in FIG. 1.
Figure 2:
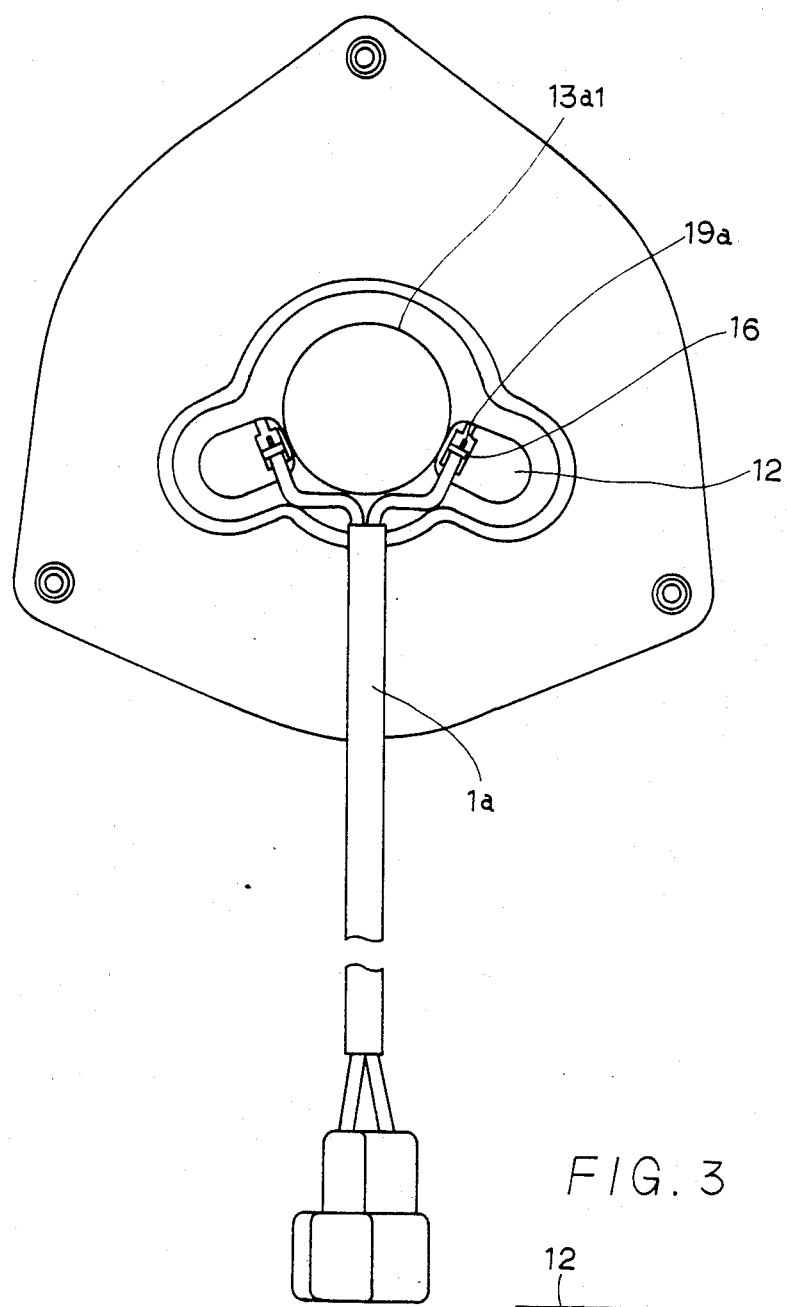
FIG. 2 is a side view showing the electric fan device.

Referring to FIGS. 1 and 2, an armature 1 will be described in the following. A center piece (or rotor) 2 made of die-cast or cold-forged aluminum is formed with steps 2a and 2b on its outer circumference. An armature plate 3 having a flattened shape is made to abut against the step of the center piece 2 such that it is electrically insulated by means of insulators 4 and 5 made of glass cloth. Then, a center ring 6 made of an aluminum or iron plate is made to abut against the left-hand side of the aforementioned insulator 4. Finally, the step 2b of the aforementioned center piece 2 is caulked to fix the aforementioned armature plate 3 to the center piece 2.

In order to enhance the fixedness of the armature plate 3, incidentally, an adhesive may be applied to both the sides of the insulator 5. On the other hand, the cylindrical portion 7b of an oilless bearing 7 having a flange 7a is press-fitted in a step 2d, which is formed in the inner circumference of the center piece 2, such that the flange 7a abuts against the step 2d.

On the other hand, a ball bearing 8 has its outer race 8a abutting against an opposite step 2e also formed in the inner circumference of the center piece 2. That outer race 8a in turn is press-fitted in the inner circumference 2f of the center piece 2 until it abuts against the step 2e. Moreover, the center piece 2 has its end face formed with a plurality of threaded portions 2g into which screws 10 for fixing a load (or fan) 9 are inserted.

Next, one housing 11 will be described in the following. This housing 11 is formed by twice reducing a cold rolled steel plate with a bar ring 11b which is positioned at the center of a reduced portion 11a at the inner peripheral portion and which is directed inwardly. Moreover, the housing 11 is formed with one rectangular hole 11c into which a brush holder 12 can be inserted.

Indicated at reference numeral 13 is a shaft which is formed with a flange 13a, a step 13b and a cylindrical portion 13c and which is fitted in the oilless bearing 7 and the ball bearing 8. The shaft 13 is made as a whole of carbon steel and is press-fitted in the inner wall of the aforementioned bar ring 11b.

Moreover, the flange 13a of the shaft 13 is fixedly welded (as indicated at 13a1) in the form of a ring to the end face of the housing 11 so as to ensure water-tightness.

On the other hand, the shaft 13 is formed at its portion opposite to the flange 13a with a groove 13d in which an E-ring 22 is fitted.

The housing 11 is formed on its outer periphery with a reduced portion 11d which is directed inward likewise the bar ring 11b. Reference numeral 11e indicates an electric fan mounting hole.

The brush holder 12 is molded of a phenol resin or the like and is formed with a rectangular hole 12a, in which a brush 14 and a brush holding spring 15 are inserted such that the brush 14 is urged to slide rightwardly of the drawing by the action of the spring 15. The brush 14 has its pigtail 14a welded and connected to the inner end of a terminal 16.

Figure 3:
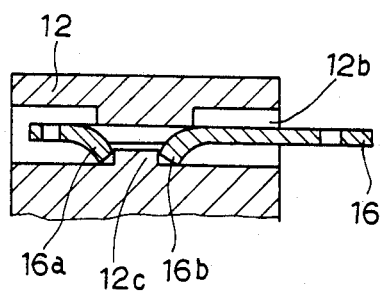
FIG. 3 is an enlarged sectional view showing an essential portion of a modification in which terminals are connected with brush holders.

The terminal 16 is formed with a pair of stopper pawls 16a and 16b and is inserted into a rectuangular slit 12b of the brush holder 12 so that it is prevented from coming out by the action of the pawls 16a and 16b. Moreover, the terminal 16 has its leading end portion formed with a hole 16c to which the core 19a of a lead wire 19 shown in FIG. 2 is connected after it has been inserted thereinto and welded thereto. As shown in FIG. 3, on the other hand, the rectangular slit 12b may have its inner periphery formed with projections 12c corresponding to the pawls 16a and 16b. In this modification, the terminal 16 can be fixed more fixedly to the brush holder 12.

A ring-shaped magnet 20 is fixed by means of an adhesive to the flat portion 11f of the housing 11. This housing is formed at its outer periphery with the reduced portion 11d which is so axially bent as to cover the outer periphery of the other housing 17.

A second housing 17 is made of a cold-rolled steel plate and is formed with a cylindrical portion 17a at its inner periphery. The cylindrical portion 17a has its inner circumference made larger than the external diameter of the step 2a of the center piece 2 of the aforementioned armature 1. Moreover, the cylindrical portion 17a has its leading end portion bent inward to repel water and dust.

On the outer circumference of the cylindrical portion 17a, there is press-fitted a cylindrical portion 18a of a cap 18 which is made of a cold-rolled steel plate for water-tightness. The cap 18 is formed with a drain 18b which extends at a right angle (radially outwardly) with respect to the cylindrical portion 18a.

Indicated at reference numeral 17b is the depth of reduction of the motor housing 17, which is selected to have such a size as to prevent the armature 3 from contacting with the housing 17. This housing 17 has its outer periphery formed with a flat portion 17c and made smaller than the outer periphery 11d of the housing 11.

Moreover, the flat portion 17c is formed with a plurality of positioning and motor fixing bar rings 17d each of which is constituted by a respective annular projection which has its inner circumferential wall formed with internal threading 17e. Numeral 23a designates a radiating member made of a heat-conductive material such as aluminum, iron or the like and fixed to a radiator fan 23 made of a resin, for example. The radiating member 23a is then fixedly secured to the metal rotor 2 by means of the screws 10, so that heat generated at the armature 1 can be transmitted to the radiating member 23a through the rotor 2 and radiated into the air therefrom.

Next, the order of the steps of assembling the embodiment thus constructed will be described in the following.

First of all, the shaft 13 fixed to the housing 11 is inserted into the oilless bearing 7 and the ball bearing 8.

Before this insertion, a clearance adjusting thrust washer 21 is sandwiched in position, if necessary, between the end face of the oilless bearing 7 and the step 13b of the shaft 13 so as to retain the clearance size between the surface of the armature plate 3 and the surface of the magnet 20.

After this insertion, so as to retain the necessary thrusting allowance on the end face of the ball bearing 8, an adjusting thrust washer 21a is fitted, if necessary, and the E-ring 22 is press-fitted in the groove 13d of the shaft 13 so as to provide a stop for the thrusting motion.

After the armature 1 has been assembled, a water-repelling sealing agent is applied to whole the periphery of the flat portion 17c of the housing 17, and the housings 11 and 17 are joined to each other. At this time, the housing 17 is fixed in position by the attracting force of the magnet 20 of the housing 11.

Next, the method of assembling the fan 23 will be described in the following. The radiating member 23a of the fan 23 is applied to the end face of the armature center piece (rotor) 2 and fixedly fastened thereto by means of screws 10, and a sealing agent is applied to the head of the screws 10 so as to ensure the water-tightness.

Next, the mounting structure of the electric fan device will be described in the following. The housing 11 is brought into abutment against the end face of a shroud 25 providing a mounting bracket, and a screw 26 is inserted into and fixedly fastened to the thread 17e of each bar ring 17d of the housing 17, each projection 17d having entered a respective hole 11e in the housing 11 in order to properly locate the housing 11 relative to the housing. Incidentally, although, in the foregoing embodiment, the male and female fitted portions of the locating means are formed of the holes 11e and the bar rings 17d, they may be formed of other portions to prevent the housings 11 and 17 from rotating relative to each other.

Next, other embodiments of the present invention will be described in the following.

The center piece 2 and the armature plate 3 may be integrally molded of a resin. In this case, the insulators 4 and 5 and the center ring 6 may be dispensed with.

As the thrust stopping structure, on the other hand, in place of press-fitting the E-ring 22 into the groove 13d of the shaft 13, a toothed washer having a plurality of teeth on its inner wall may be axially press-fitted in accordance with the thrusting allowance required. In this case, a thrust washer may be inserted, if necessary.

As the adjustment of the air gaps at both sides of the armature plate 3, on the other hand, the inner race of the ball bearing 8 and the cylindrical portion 13c of the shaft 13 are so sized that they can be fixedly press-fitted, in place of inserting the thrust washers 21 and 21a, and the bearing 8 is press-fitted on the shaft 13 so that the necessary air gaps may be retained at both the sides of the armature plate 3. With this construction, the thrust washers 21 and 21a can be dispensed with so that the assembly can be facilitated.

As a counter-measure for preventing water from leaking around the screw 10 for mounting the fan 23, the sealing agent is applied to the head of the screw 10. According to another embodiment, however, a water preventing or repelling sealing agent may be applied to the righthand end face of the armature center piece 2. Moreover, the fan 23 may be assembled with the center piece 2 through a sealing gasket (or packing) or an O-ring.

On the other hand, an insulating paint may be applied either by itself or together with a thin insulating seat to both the sides of the outer periphery of the armature plate 3, thereby to prevent the armature plate 3 from warping due to vibrations or the like and from contacting with the housing 17 and accordingly from being grounded.

Incidentally, either the aforementioned insulating paint or thin insulating sheet may be applied to both the inner periphery of the housing 17 facing the armature plate 3 or the surface of the magnet 20.

On the other hand, the armature center ring 6 for fixing the armature plate may be dispensed with by applying an adhesive to both the sides of the insulator 5 thereby to increase the fixedness.

Although the cap 18 is press-fitted in the housing 17, the cap portion may be integrally molded by reducing the leading end portion 17a of the housing 17.

In the above-described embodiment the fan 23 is attached by fixedly fastening the screw 10. However, the fan 23 may be fixed by forming a projection on the end face of the armature center piece 2, by inserting that projection into the hole of the member 23a of the fan 23 and by press-fitting a toothed washer having a plurality of teeth in the inner wall of the projection inserted.

Incidentally, the housings 11 and 17 have to be made of a ferromagnetic substance such as steel if they are to be temporarily fixed by the magnetic force of the permanent magnet 20. The portions referred to as the bar rings 17d in the present invention are cylindrical projections which are cut out of a metal plate by the pressing operation. Moreover, the fixture 25 may be rivet or a bolt in addition to the screw. On the other hand, the bracket 25 may be an arm-shaped bracket or the like in addition to the shroud.

In the embodiments of the present invention thus far described, by the force acting in the axial direction of the permanent magnet 20 and as a result that each bar ring 17d, for example, providing the male fitted portion is fitted in a respective hole 11e, for example, providing the female fitted portion, there can be attained effects that the housings 11 and 17 can be temporarily fixed to a sufficient extent without coming out in the axial directions and rotating relative to each other, that the housings 11 and 17 can be firmly fixed to each other simultaneously as the flattened electric motor is to be attached to the bracket 25, that the mounting fixture 26 can be commonly used, and that the number of the assembling steps can be reduced.

In the foregoing embodiment of the present invention, moreover, the brush holder acts partly to hold the brush and partly to function as a grommet for extending therethrough the lead wire for leading the electric power into the housings of the electric motor. As a result, there can be attained an effect that the special grommet can be dispensed with so that the number of parts can be reduced together with the production cost.

What is claimed is:

1. An electrically-operated, automotive cooling fan device, comprising:
   first and second housing members joined to define between them a motor chamber;
   a shaft fixed to said first housing member and extending within said motor chamber;
   bearing means mounted on said shaft;
   a rotor rotatably supported on said shaft by said bearing-means, said rotor extending within said motor chamber and having an end exposed externally of said motor chamber;
   an armature disk fixed to said rotor and extending radially outwardly therefrom within said motor chamber;
   magnetic field means fixed to one of said housings and being thereby disposed to face said armature plate within said motor chamber for generating a magnetic flux as said rotor is turned;
   a heat-radiating member fixed to said rotor at said exposed end of said rotor, so that said heat-radiating member is juxtaposed with said motor chamber but located externally of said motor chamber, said heat radiating member having a radially outer periphery; and
   an annular, automotive cooling fan fixed to said heat-radiating member at said radially outer periphery of said heat-radiating member and extending therefrom, with said heat-radiating member thereby being constructed and arranged to function as a hub for said fan;
   said heat-radiating member being made of heat-conductive metallic material and having an axially outer, radially central portion which is exposed externally of said device for radiating heat therefrom;
   one of said housing members including contiguous portions made of heat-conductive metallic material juxtaposed with said armature disk and said heat-radiating member, whereby heat generated in said armature disk may be conducted to proximity of said heat-radiating member, radiate to said heat-radiating member, be conducted through said heat-radiating member and be radiated to externally of said device from said heat-radiating member.

2. The electrically-operated, automotive cooling fan device of claim 1, further including:
   means defining a plurality of spaced apart axially directed holes through said first housing member;
   means defining a corresponding plurality of correspondingly spaced and oriented annular projections provided on said second housing member, each said projection having an internally threaded internal circumferential wall opening axially in the direction that said first housing member adjoins said second housing member;
   said magnetic field means being fixed to said first housing member;
   said second housing member, at least in a region which is constructed and arranged to sufficiently closely facially indirectly confront said magnetic field means via intermediacy of said armature plate when said annular projections are received in corresponding ones of said holes as said first and second housing members are being joined as to be subject to being attracted and held in place magnetically by said magnetic field means, being made of ferromagnetic material;
   an automotive radiator shroud constructed and arranged to be mounted in relation to an automotive radiator, said shroud including a mounting bracket constructed and arranged to have said first housing member abutted therewith;
   a plurality of holes formed through said mounting bracket and axially aligned with respective ones of said holes in said first housing member; and a corresponding plurality of threaded fasteners threadedly installed through corresponding ones of said holes in said mounting bracket into said internally threaded internal circumferential walls of corresponding ones of said annular projections and serving both to secure said first and second housing members in joined relation and to secure said first and second housing members to said mounting bracket.

3. The electrically-operated, automotive radiator-cooling fan device of claim 1, wherein:

said one housing member to which said magnetic field means is fixed to said first housing member;

said second housing member has an inner peripheral edge interposed between said armature disk and said heat-radiating member and disposed circumferentially adjacent said rotor; and further comprising:

an annular, radially outwardly directed cap flange perimetrically secured at the radially inner periphery thereof to said second housing member so as to extend from adjacent said inner peripheral edge radially outwardly toward adjacency with said cooling fan in order to provide protection against water infiltration into said motor chamber between said second housing member and said fan.

4. The electrically-operated automotive cooling fan device of claim 1, wherein:

said one housing member to which said magnetic field means is fixed is said first housing member;

a plurality of brush holders made of synthetic resin, each said brush holder being mounted in a respective hole in said housing and mounting a respective brush which is resiliently urged by spring means into contact with a face of said armature disk;

each said brush holder having a slit formed therethrough for communicating through said first housing member into said motor chamber;

each said brush holder having projection means formed thereon so as to partially constrict each respective slit intermediate outer and inner ends of such slot;

a terminal press fit into each slit so as to be fixed therein at least in part by engagement with said projection means;

respective first electrical connector means electrically connecting an inner end of each said terminal with a respective said brush; and respective second electrical connector means electrically connecting an outer end of each said terminal with lead wire means of an external electrical power source.

5. The electrically-operated automotive cooling fan device of claim 4, wherein:

each said terminal includes a pair of axially oppositely directed, axially spaced pawls axially oppositely engaging said projection means for fixing said terminals in said slits, whereby each said brush, spring means, brush holder, first electrical connector means, armature disk and second housing member can be assembled to said first housing member from a same direction.

* * * * *